United States Patent [19]
Beldock et al.

[11] Patent Number: 5,183,712
[45] Date of Patent: Feb. 2, 1993

[54] BATTERY HAVING RESERVE CELL AND THREE OR MORE TERMINALS

[75] Inventors: Donald T. Beldock, 50 E. 72nd St., Apt. 13A, New York, N.Y. 10021-4246; Paul P. Craig, Martinez, Calif.

[73] Assignee: Donald T. Beldock, New York, N.Y.

[21] Appl. No.: 712,951

[22] Filed: Jun. 10, 1991

Related U.S. Application Data

[63] Continuation-in-part of Ser. No. 649,907, Feb. 4, 1991.

[51] Int. Cl.$^5$ .................. H01M 12/00; H01M 2/10
[52] U.S. Cl. .......................... 429/9; 429/97; 429/99; 429/100; 429/178
[58] Field of Search ............ 429/9, 97, 99, 100, 429/178, 179

[56] References Cited

U.S. PATENT DOCUMENTS

| | | | |
|---|---|---|---|
| 1,024,577 | 4/1912 | Hite | 429/179 X |
| 2,988,588 | 6/1961 | Hartwig | 429/100 |
| 3,242,009 | 3/1966 | Schilke | 429/9 |
| 4,213,078 | 7/1980 | Ferrell et al. | 429/100 X |
| 4,514,477 | 4/1985 | Kobayashi | 429/99 X |
| 4,818,928 | 4/1989 | Schosser | 429/99 X |

Primary Examiner—Stephen Kalafut
Attorney, Agent, or Firm—David P. Gordon

[57] ABSTRACT

A sealed battery is provided having three or more terminals, with at least one positive terminal on one end of the battery and at least one negative terminal on the other end of the battery. The extra terminal is coupled to a reserve portion of the cathode or anode, with the main and reserve portions of the cathode or anode being separated by insulation. The extra terminal may be located on the top, bottom, or side of the battery according to the various embodiments provided. Battery holders for accomodating the three terminal batteries are also provided. With three terminals, different types of switching may be utilized to bring the reserve into play automatically, or by manual or remote activation, and either in a parallel manner with the main cell, or independently thereof. The sealed batteries having three terminals are designed to be backward compatible so that they may be used in standard battery holders.

32 Claims, 13 Drawing Sheets

BATTERY HAVING RESERVE CELL AND THREE OR MORE TERMINALS

This is a continuation-in-part of U.S. Ser. No. 07/649,907, filed Feb. 4, 1991 assigned to the assignee hereof, and hereby incorporated by reference herein in its entirety.

BACKGROUND OF THE INVENTION

This invention generally relates to electricity producing apparatus such as batteries. More particularly, this invention relates to batteries having a primary cell and an integral reserve or backup cell.

Batteries of numerous types and construction have been known to the art for a long time. There are standard sized batteries (e.g. AAA, AA, C, D, 9V, button, etc.), and nonstandard sized batteries. There are primary type batteries, and secondary rechargeable type batteries. There are Leclanche type cells, alkaline cells, mercury cells, etc. Some of the batteries use a nail electrode, some use a carbon rod electrode, while others use. foil. There are batteries which require activation. Activation may be via the use of movable mechanical means which provides relative motion between the electrode and electrolyte, by the introduction of electrolyte via the breaking of frangible means in the battery, or by other mechanisms. Some batteries have single cells, while other batteries have plural cells.

In the electronics age, our society is dependent upon numerous electronic apparatus which require electric power of one type or another. Many of the electronic apparatus which are widely used are portable, including cameras, watches, dictating equipment, computers, radios, toys, calculators, and hearing aids. Such portable electronic equipment requires batteries for operation and typically uses batteries of standard sizes.

The battery powered apparatus cited above, among others, including those equipped with warning devices indicating remaining battery strength or depletion, all exhibit a common deficiency which limits their utility, the consumer satisfaction they deliver, and their market. That common deficiency is the tendency of the battery powered apparatus or system to fail (i.e. to cease to perform acceptably), when the battery reaches a critical point of depletion. This characteristic not only subjects the user to extreme inconvenience and frustration, which is not effectively eliminated by the use of battery testing devices, but it also requires the user to purchase and carry extra batteries of specific sizes if the user wishes to ensure reliable performance and avoid untimely battery and hence apparatus failure. In other words, unless the user is prepared to take inconvenient precautions, the user is subjected to the risk of failure at critically inconvenient moments of the equipment which is to be used. At those moments, the user may not have the ability, readily at hand, to reactivate the system quickly and conveniently.

Mechanical solutions to the problem have been scarce, and practical solutions are essentially nonexistent. Portable battery testers have recently come into use which provide an indication of the relative charge of the battery. These testers, however, fail to provide the user of an indication as to how much life the battery has left vis-a-vis certain equipment. Moreover, it is not always convenient to use the tester to test the batteries in the equipment each time prior to using the equipment or prior to departing with the equipment for use at a later time. As a result, while helpful in certain circumstances, the battery testers fail to provide a mechanism whereby the frequent user of portable electronic equipment will not find himself in the frustrating circumstance of not being able to use portable electronic equipment due to lack of battery power.

Previous solutions have also failed to be effective. For example, in O'Donnell U.S. Pat. No. 3,486,944, a standard sized battery is disclosed as having an active cell and a reserve cell of apparently equal size. A terminal spacer conductor cap is placed over the reserve cell to provide electrical connection, with the reserve cell being out of the circuit. When the active cell is exhausted, the battery is rearranged by the user by dislodging the terminal spacer, sliding the cells out of a perimeter material, rearranging the cells so that the reserve cell replaces the active cell, and reinserting the terminal spacer appropriately. While the arrangement disclosed by O'Donnell may work to provide a reserve cell, it is impractical, as effectively O'Donnell is providing two separate cells in one package. Thus, the cost of the battery would effectively be twice the cost of an ordinary battery. Moreover, by having two separate cells, volume is wasted, and the procedure for rearrangement is inconvenient. Further, since both cells are of equal size, the user is not provided any advantage over placing extra batteries in a sack or the like attached to the apparatus in which the batteries are needed. Also, the reconfiguration of the O'Donnell arrangement is difficult and inconvenient for an ordinary user. In other words, the O'Donnell battery does not provide effective solutions for the user of battery operated apparatus to the problem of batteries which are exhausted at a most inconvenient time.

Batteries having more than two terminals are also known in the art. For example, Goebel U.S. Pat. No. 4,447,504 shows an electrochemical cell having a pair of battery stacks positioned one above the other in a housing and separated by an insulator. The relative thicknesses of the components of the stacks as well as the number of components in the stacks are controlled to achieve different discharge rates and durations of discharge. However, the Goebel battery as conceived and arranged is not a battery which provides an extra reserve, and the Goebel battery is not intended for and is not appropriate for backwards compatibility; i.e., it cannot be used in conventional equipment which requires a positive terminal on one end and a negative terminal on the other end of the battery. Rather, Goebel provides a battery which can power more than one load, and which uses negative terminals on each end and uses the housing as a positive terminal.

Another battery which has more than one cell in a single casing and which has more than two terminals is shown in Schilke U.S. Pat. No. 3,242,009. The stated purpose of the Schilke battery is to provide power to several loads at one time. As such, Schilke is not intended for use as a battery which has an extra reserve and it is not intended for backward compatibility.

SUMMARY OF THE INVENTION

It is therefore an object of the invention to provide a sealed battery having a reserve with its own terminal which via external switching can be activated upon failure of the battery to power electronic equipment.

It is another object of the invention to provide a single sealed battery with three or more terminals and with a relatively large primary cell and a limited reserve, where the reserve is activated by switching on the terminals upon exhaustion of the primary cell.

It is a further object of the invention to provide a sealed battery with a primary cell and a reserve which share components and together provide a battery life substantially similar in length to standard batteries, where the sealed battery has an anode terminal on one end, a cathode terminal on the other end, and where the reserve portion may be switched in via an external switching arrangement.

An additional object of the invention is to provide a sealed battery with three terminals and with a primary cell and a reserve, where the primary cell is backward compatible with the batteries of the art without redesign of the apparatus which the batteries power, and where the reserve cell can be activated with switching mechanism of a "next generation" apparatus design.

For clarity purposes herein, the term "anode" as used herein refers to anodic material in the battery; the term "cathode" as used herein refers to cathodic material in the battery; the term "positive terminal" as used herein refers to the electrode coupled to the cathodic material in the battery; and the term "negative terminal" as used herein refers to the electrode coupled to the anodic material in the battery.

In accord with the objects of the invention a sealed battery is provided and broadly comprises cathodic and anodic materials in proximity with each other and separated by a membrane, with at least one of the cathodic and anodic materials being divided by an insulator into primary and reserve portions. Where the anode is divided into primary and reserve portions, a first anode current collector is coupled to the first anode and to a first negative terminal, while a second anode current collector is coupled to the second anode and a second negative terminal. Effectively, the cathode, first anode current collector, and first anode then comprise a primary cell of a first size, and the cathode, second anode current collector, and second anode comprise a reserve cell which is typically substantially smaller in size and capacity than the primary cell. With a third external terminal which is a terminal for the reserve cell, the reserve cell can be brought into parallel activation with a depleted primary cell or into independent activation in any of various manners, including, automatic activation, manual activation, or remote activation. Switch mechanisms which take advantage of the three terminals can be built into the battery holders of the electronic equipment which utilizes the three terminal batteries. By including switch mechanisms in the battery holders, advanced electronic switches can be used which can also provide additional functions such as audible warnings, automatic switching, etc. Similarly, battery and switch designs are presented which permit easy mechanical switching such as by rotation of the three terminal battery, or simple manipulation of a switch.

The battery invention applies to different types of cells. Thus, the battery may be a Leclanche cell, an alkaline cell, a mercury cell, a lithium cell, a cell having an inner cathode and an outer anode, or an inner anode and an outer cathode, etc. The battery invention envisions the use of an external switch to activate either reserve anode material, reserve cathode material, or both. The basic cell design may be capacity-limited by the amount of anode material, by the amount of cathode material, or by both. Depending upon the type of cell utilized, the current collector may be a carbon rod, a metallic nail, a metallic foil, an HgO electrode, a metallic powder, or other electric conductor. Likewise, the anode and cathode materials may vary, as may the electrolyte.

The provided battery invention overcomes the deficiencies common to all other appliance-powering batteries by providing the user with a warning that the battery capacity is about to be exhausted, while at the same time giving the user the opportunity to extend the life of the battery for a reasonable additional period of time. The extension of battery life is obtained automatically, via manipulation of an external switch, or via movement of the the battery or batteries so as to activate the reserve power source which is integral to the battery of the invention. During the period of time in which the reserve power source restores and maintains the full function of the equipment being powered, the user has the opportunity at the user's convenience to obtain battery replacements. The invention, therefore, not only improves the performance of batteries and battery-powered systems, but by increasing the reliability of such systems and the satisfaction they deliver, will tend to increase consumer reliance on such products and hence the size of the market for them.

Additional objects and advantages of the invention will become apparent to those skilled in the art upon reference to the detailed description taken in conjunction with the accompanying drawings.

BRIEF DESCRIPTION OF THE DRAWINGS

FIG. 5b is a view through section A—A of FIG. 5a;

DETAILED DESCRIPTION OF THE PREFERRED EMBODIMENTS

Figure 1A:
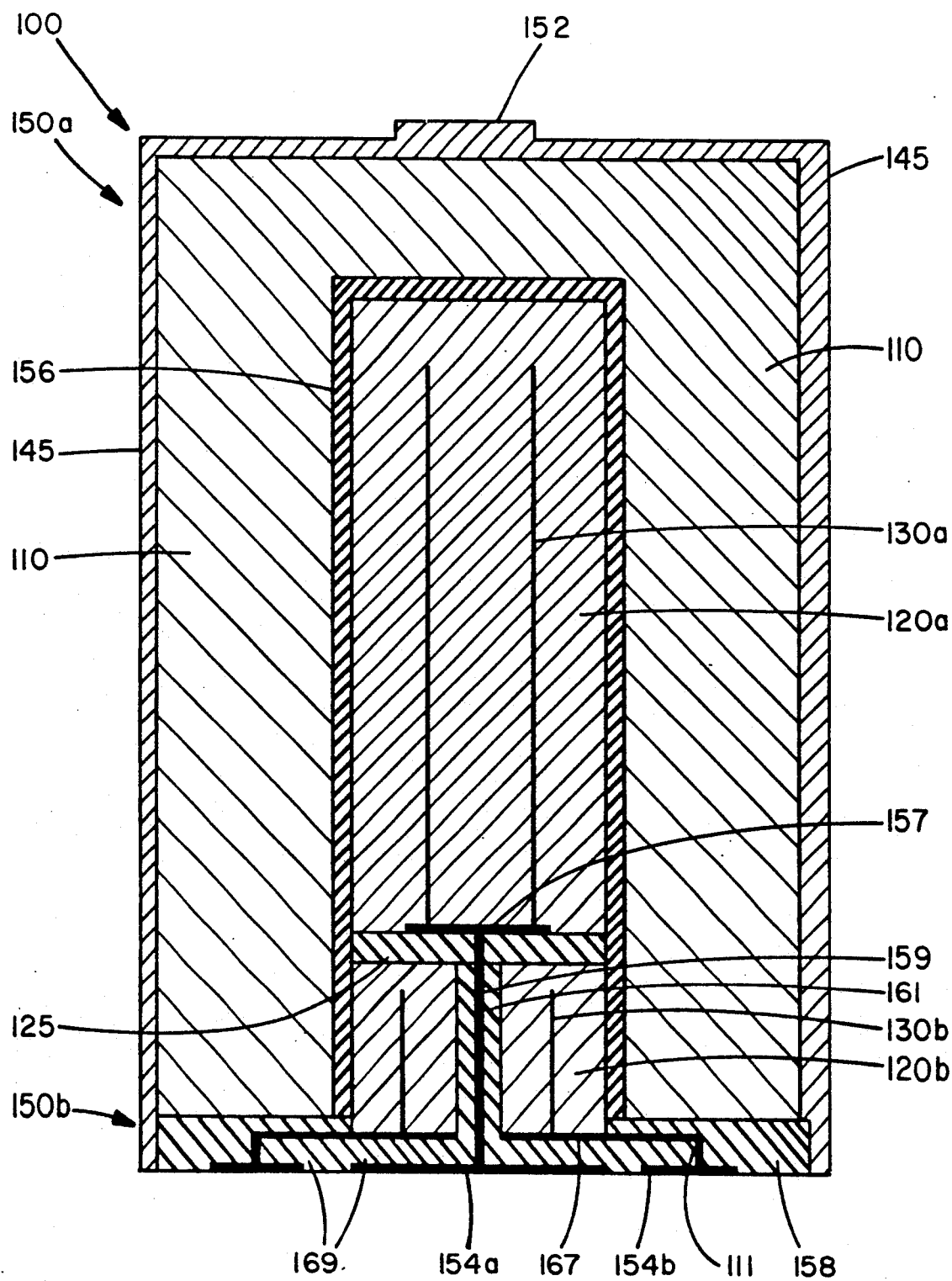
FIG. 1a is a cross-sectional view through a first embodiment of a sealed reserve type battery having three terminals, where two terminals are concentric anode terminals and the third is a cathode terminal.

Turning to FIG. 1a, a first sealed reserve type battery 100 is seen and broadly includes a cathode 110, a first larger anode 120a, a second smaller anode 120b, an insulator 125 which separates the anodes 120, first anode current collector 130a, and a second anode current collector 130b; all of which are encompassed by an outer jacket, can, or seal 145 which is typically comprised of metal which is at least partially covered by plastic or paper. The cathode 110, together with the larger anode 120a and first current collector 130a provide a first or primary cell 150a, while the cathode 110, together with the smaller anode 120b and second current collector 130b provide a second or reserve cell 150b. The cathode, which may take many forms, (e.g. manganese dioxide ($MnO_2$) for an alkaline cell), is coupled to a first (positive) terminal 152, while the current collectors 130a and 130b, which may take different forms (e.g. a wire or a foil current collector) are coupled to a first negative terminal 154a and to a second negative terminal 154b respectively. The anodes 120a and 120b which may also take many forms, (e.g. powdered zinc (Zn) for an alkaline cell), extend around the current collectors 130a and 130b. As is common in primary type batteries, an ion-permeable membrane 156 which is an electronic insulator is located between the cathode 110 and the anode 120. The membrane 156 is chosen to permit the flow of ions from the anode to the cathode. While membrane 156 permits ionic flow, which is expedited by a typically aqueous electrolyte (not shown), insulator 125 is preferably chosen to limit leakage currents to a minimum. Also, as is common in primary type batteries, an insulating ring 158 is provided at the negative terminal end of the cathode 110 to prevent the cathode from becoming a short circuit path between terminals. A crimp (not shown) is also often provided for sealing the battery after the contents of the battery are inserted into the jacket 145 during manufacture.

As seen in FIG. 1a, the current collector 130a of the primary cell 150a terminates in a conducting plate 157 which is connected to an electronically conducting post or wire 159. The post 159 extends through the insulator 125 which separates anode 120a from anode 120b, and through insulator 161 which insulates post 159 from the reserve anodic material 120b, and connects directly to the first negative terminal 154a which is preferably comprised of a metal plate. Also, as seen in FIG. 1a, the current collector 130b of the secondary or reserve cell 150b terminates in a conducting plate 167 which has a feed through at 111 to negative terminal 1544b. Negative terminals 154a and 154b are preferably insulated from each other by an insulating pad 169 which is also chosen to prevent leakage currents therethrough, and which may be integral with insulating ring 158 if desired. Insulating pad 169 also separates conducting plate 167 of the reserve cell from the negative terminal 154a of the primary cell. If desired, insulator 161 may be integral with insulator 125 and/or insulating pad 169.

Figure 1B:
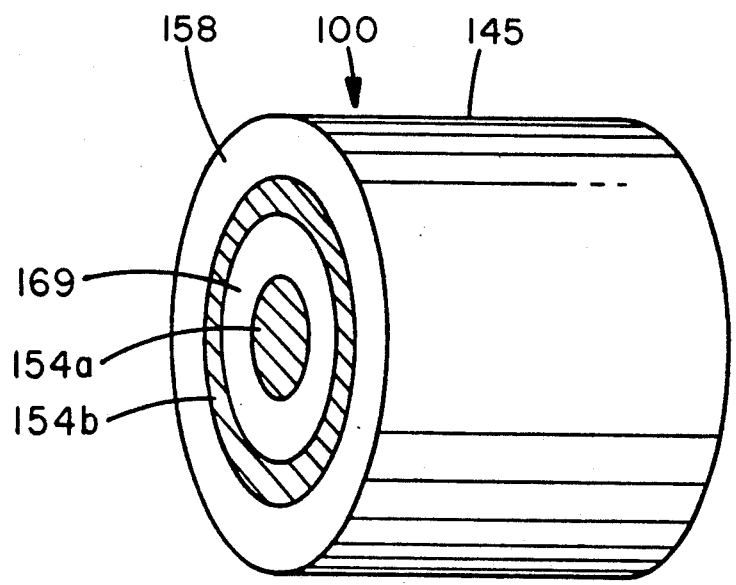
FIG. 1b is a perspective schematic view of the battery of FIG. 1a on its side.

Turning to FIG. 1b, it is seen that negative terminals 154a and 154b preferably comprise concentric rings which are separated by insulator 169. As so arranged, the battery 100 of the invention is compatible with existing equipment as only negative terminal 154a will be zn contact with the anode contact of the equipment; negative terminal 154b being located too far from the center of the battery to make contact with standard anode contacts.

As will be discussed hereinafter with reference to FIGS. 3a, and 3b, the additional negative terminal 154b need not be configured as a concentric ring as shown in FIG. 1b. Rather, terminal 154b can be configured as a partial ring or in a different manner as desired. Regardless of the arrangement or location of the third or extra terminal, in accord with the invention, the positive and primary negative terminals are located in their standard locations such that the battery can be used in conventional equipment.

In use, when a load or resistance (not shown in FIGS. 1a or 1b) is placed across terminals 152 and 154a of battery 100, ionic current is caused to flow across the membrane 156, between the cathode 110 and the first anode 120a. Before activation of the reserve cell, the current collector 130a withdraws electrons from reactive material 120a (zinc in a typical alkaline or Leclanche cell) and passes the electrons to the conducting plate 157, and then through the conducting post 159 to the first negative terminal 154a. Little or no electronic or ionic current passes from the cathode 110 to the second anode 120b, as the second anode 120b and second negative terminal 154b are not part of the circuit, and insulator 125 and insulating pad 169 prevent electronic or ionic flow between anodes 120a and 120b or between the negative terminals 154a and 154b. The electronic current provided by the larger cell 150a is thus available to the load, and after the electrons pass through the load they are received at the positive terminal 152 of the battery 110. After a period of time, when the capacity of the larger cell 150a has been exhausted, the equipment in which battery 100 is being used will malfunction or give some other indication that the battery 100 must be replaced. At that time, the user of battery 100 must activate the reserve cell 150b by switching the reserve cell into the circuit (as will be described in more detail hereinafter). Depending upon the switching arrangement, the reserve cell may either be brought into the circuit in parallel with the larger cell, or separately therefrom. Regardless, the user of the battery may continue to power the equipment until the reserve cell 150b (and the larger cell 150a if in parallel relationship) is inadequate to the task. At the same time, however, the user of the battery is given fair warning that the battery is about to be exhausted, and that at the next possible opportunity, the battery should be replaced.

It will be appreciated by those skilled in the art that by providing a substantially larger primary cell 150a compared to the reserve cell 150b, everything else being equal, the primary cell 150a will last nearly as long as an ordinary battery without a reserve. The reserve cell 150b, therefore, only provides a fractional additional battery "life" (which may be chosen as desired by the manufacturer) on depletion of the primary life. However, it does so together with a warning provided either by deterioration of system performance on depletion of the primary section of the battery or by a signal, in a manner which not only informs the user that the battery power will soon run out but also assures the user of full performance of the battery-driven system while the user obtains replacement batteries at the user's convenience. Thus functionally invention permits the user to avoid the frustrating experience of battery and system failure at inconvenient moments.

It will further be appreciated that while, preferably, the primary cell 150a is substantially larger than the reserve cell 150b, in principle, there is no reason why the concepts of the invention could not apply to primary and reserve cells of different relative sizes. In fact, there may be situations where it is desirable to have the primary cell be the same size or smaller than the reserve.

Figure 2:
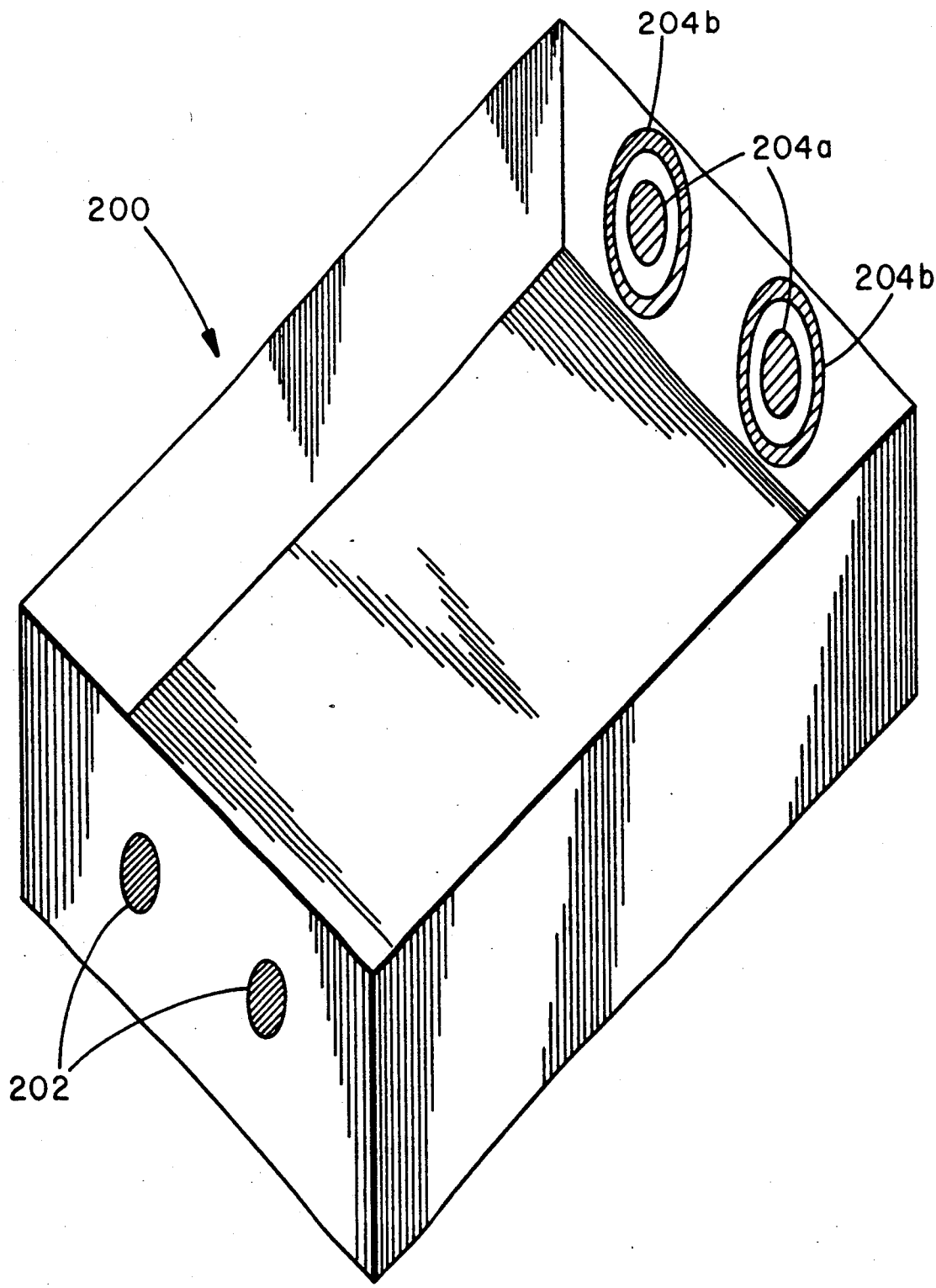
FIG. 2 is a schematic of a battery case for holding two of the FIG. 1a batteries.

Before turning to FIG. 2, it should be noted that while the embodiment of FIGS. 1a and 1b show a battery with an arrangement of an outer cathode and two inner anodes, with current collectors located in the anodes, and with the cathode connected to the top (positive) terminal and the anodes connected to two bottom (negative) terminals, the shown embodiment .are intended to be representative only, as the invention clearly extends to batteries of all arrangements. For example, simply by switching the anodic material of the embodiment of FIGS. 1a and 1b with the cathodic material of those embodiments while leaving the current collectors in place, a reverse polarity battery having two cathodes and a single anode (and two positive terminals and one negative terminal) is provided according to the invention. If standard polarity is desired, minor design modifications can easily be made. In a slightly different manner, the entire inner structure, including the two anodes, the current collectors, and the insulators and plates can be moved to the outside, while the cathode can be moved inward. With the outer anodes having the current collectors, and an inner cathode, only minor design changes would be needed from what is shown. Reference may be had to the parent application hereto for additional modifications to the preferred embodiment.

Turning to FIG. 2, a battery holder 200 is shown for holding two of the batteries of FIG. 1a. The battery holder 200 is preferably formed from plastic or other nonconductive material and preferably includes spring contacts 202 for contacting the positive terminals 152 of batteries 100, and spring contacts 204a and 204b for contacting the first and second negative terminals 154a and 154b of batteries 100. As indicated in FIG. 2, the spring contacts 204a are centrally located such that they will contact the standard negative terminal of a standard AA battery. Spring contacts 204b may take a variety of forms, such as by way of example and not limitation, coil springs or bent flat strips of springy (resilient) material. Those skilled in the art will recognize that while three contacts are required, only one of the contacts need be a resilient contact (although preferably at least two are) to guarantee a friction fit and hence a proper contact of the battery in the holder.

As seen in FIG. 2, the spring contacts are arranged so as to contact the concentric electrodes on the battery. Typically, the inner contacts 204a will make contact with the terminal for the main portion of the battery, while the outer contacts 204b will make contact with the terminal for the reserve portion of the battery. Of course, this arrangement can be reversed by changing the design of the battery itself.

The battery holder 200 and the batteries of the invention are designed with backwards compatibility in mind. Thus, if a standard battery (lacking reserve features) is inserted into battery holder 200, contact will be made between the anode terminal and contact 204a. This assures that the battery holder which is designed for batteries with reserve capacity will still function should only conventional batteries be available. Conversely, with the design of the battery of the invention, the terminal for the main portion of the reserve type battery will always contact the spring contact of a standard battery holder, thus effectively powering a device even if the third terminal is not brought into play. If desired, the battery 100 of the invention can be designed with the reserve anode terminal positioned very closely to the main anode terminal such that when inserted in a normal holder, both terminals will contact the anode contact of the standard battery holder. However, even if the reserve anode terminal is not positioned close enough to the main anode terminal to make contact, if desired, a small metal contact plate or cover cap (not shown) can be provided to connect the primary and reserve terminals so that full usage of the battery in a standard battery holder can be obtained.

With the spring contacts of battery holder 200 arranged as shown, three wires (see FIGS 6a and 6b) are available for each battery. The three wires can be used in different ways to effect the switching in of the reserve portion of the battery as discussed in more detail hereinafter with reference to FIGS. 6a and 6b.

Figure 3A:
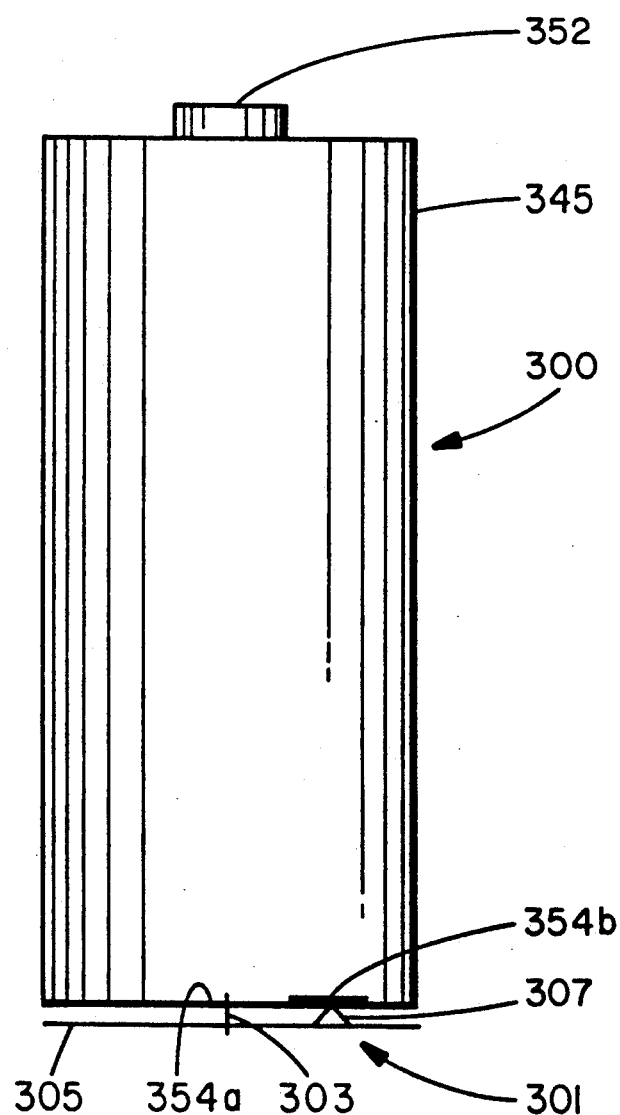
FIGS. 3a and 3b are side and bottom views respectively of a slightly modified battery from that of FIG. 1a in conjunction with a rotating external switch.
Figure 3B:
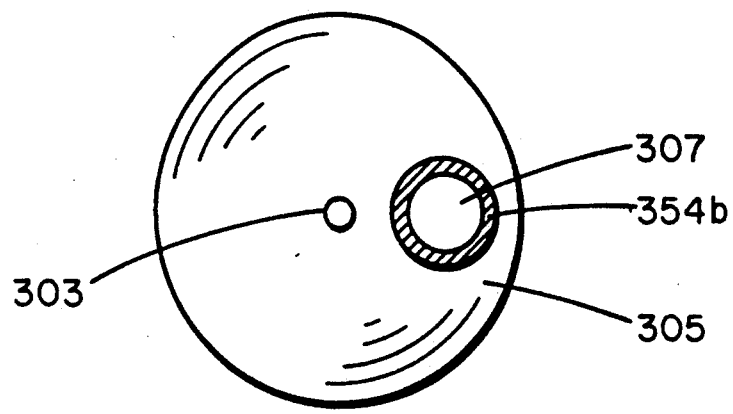

As seen in FIGS. 3a and 3b, a rotating external switch 301 is provided for battery 300 which is similar to battery 100 of FIG. 1 except that second negative terminal 354b is located as a non-concentric circle on the bottom of the battery rather than as a concentric ring. Switch 301 is actually integral with the battery 300 although it is external to the typical battery package. Switch 301 includes d conducive rod 303, a conducive plate 305, and a conductive spring 307. The conductive rod 303 extends outward from the standard negative terminal 354a and may actually comprise an extension to conducting post 159 of the battery 100 of FIG. 1a. Thin conducting plate 305 is attached to and rotates on conductive rod 303 and effectively constitutes the true negative terminal of the battery. Conductive spring 307 is attached to and eccentrically located on the thin conducting plate 305, such that upon rotating the thin conducting plate 305 relative to the bottom of the standard battery package, spring 307 will eventually contact the negative terminal 354b if the spring 307 and negative terminal 354b are properly aligned as shown in FIGS. 3a and 3b. When the spring 307 contacts the second negative terminal 354b, the reserve portion of battery 300 is brought into an electrically parallel arrangement with the primary portion of battery 300. When the spring 307 is not in contact with the second negative terminal 354b, the reserve portion of battery 300 is inactive.

Figure 4B:
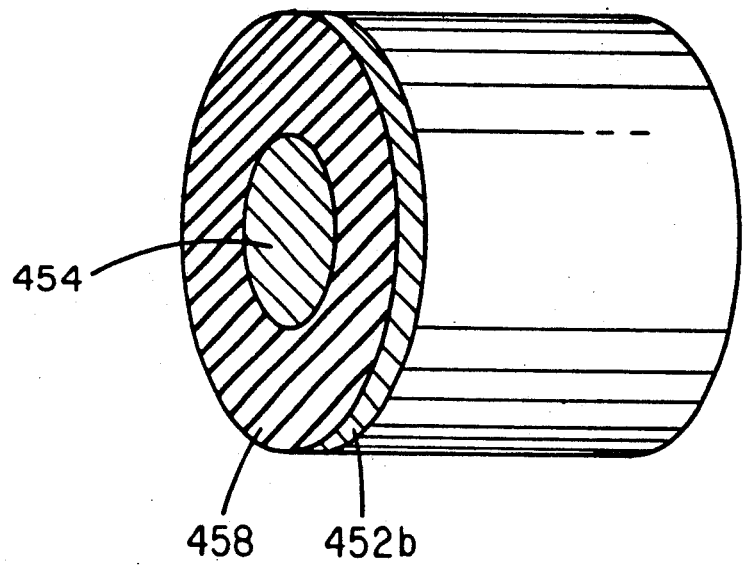
FIG. 4b is a perspective schematic view of the battery of FIG. 4a on its side.
Figure 4A:
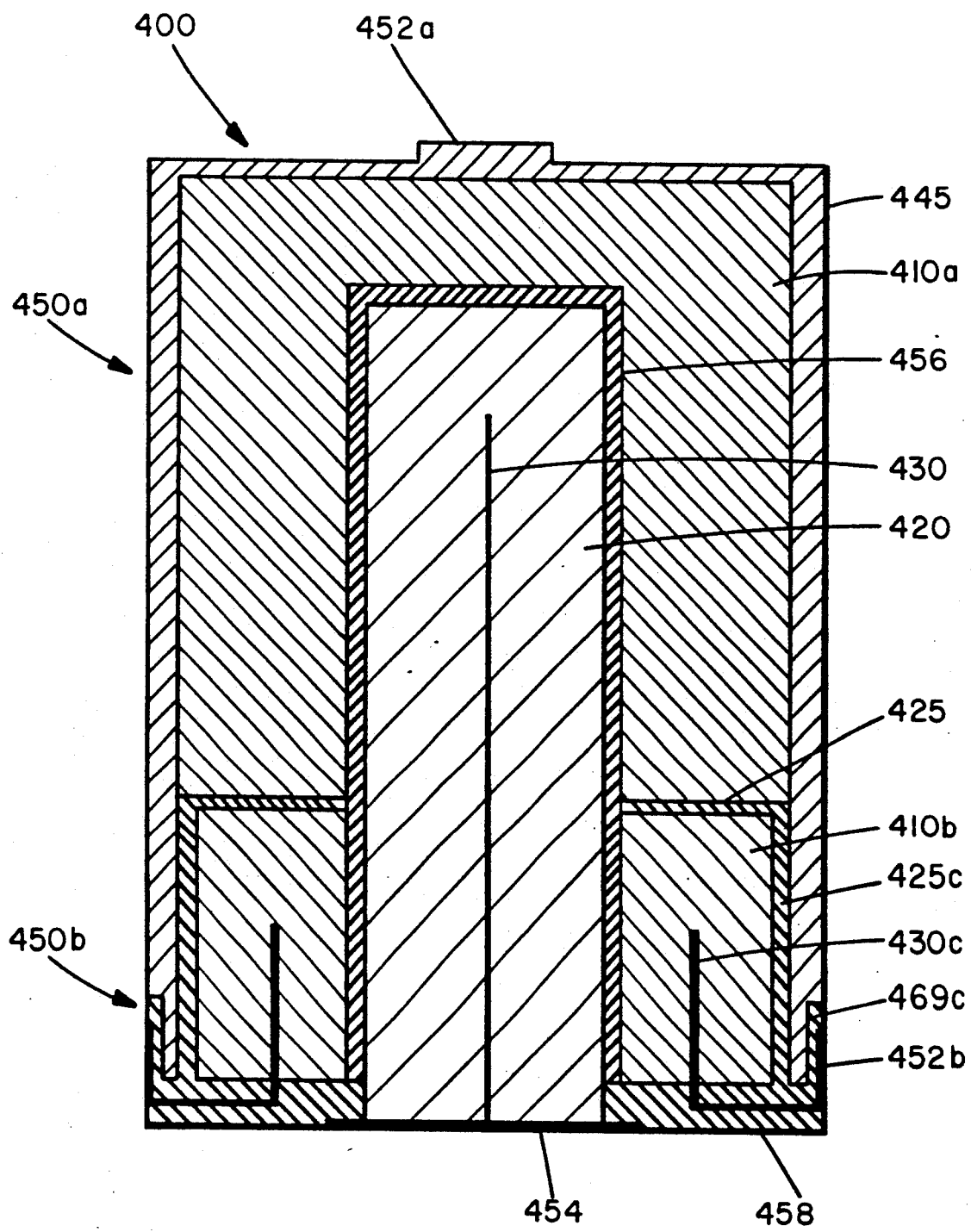
FIG. 4a is a cross-sectional view through a second embodiment of a sealed reserve type battery having three terminals, where two of the terminals are cathode terminals, and the third terminal is an anode terminal.

Turning to FIGS. 4a and 4b, a second embodiment 400 of the battery invention is seen. Battery 400 has first and second cathodes 410a and 410b which are separated by an insulator 425, an anode 420, an anode current collector 430, a cathode current collector 430c, a membrane 456 which separates the cathodic material from the anodic material, and a can 445. The first or larger cathode 410a, the anode 420a, and the anode current collector 430 provide a larger cell 450a, while the second or smaller cathode 410b, anode 420, and cathode current collector 430c provide a smaller reserve cell 450b. In the embodiment of battery 400, cathode 410a is directly coupled to a first positive terminal 452a, anode 420 is directly coupled to the negative terminal 454, and the second cathode 410b is coupled to a second positive terminal 452b. The first positive terminal 452a is insulated from the second positive terminal 452b by insulator 469c, while the second positive terminal 452b and the cathode current collector 430c to which is is coupled is insulated from the negative terminal 454 by insulator 458. In addition, to avoid current flow from the primary cathode section 410a to the reserve cathode section 410b via conductive can 445, insulator 425 is extended around the reserve cathode section 410b as seen at 425c. If desired, one or more of insulators 425, 425c, 458, and 469c can be integral with each other.

Figure 5A:
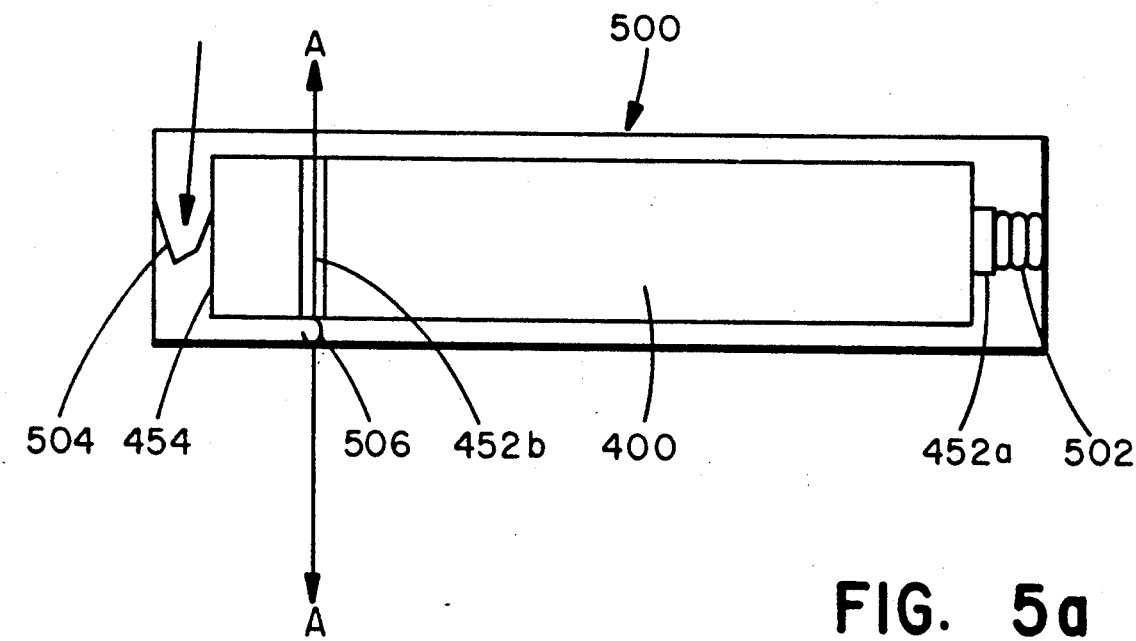
FIG. 5a is a cross-sectional view of a battery case for holding one of the FIG. 4a batteries.
Figure 5B:
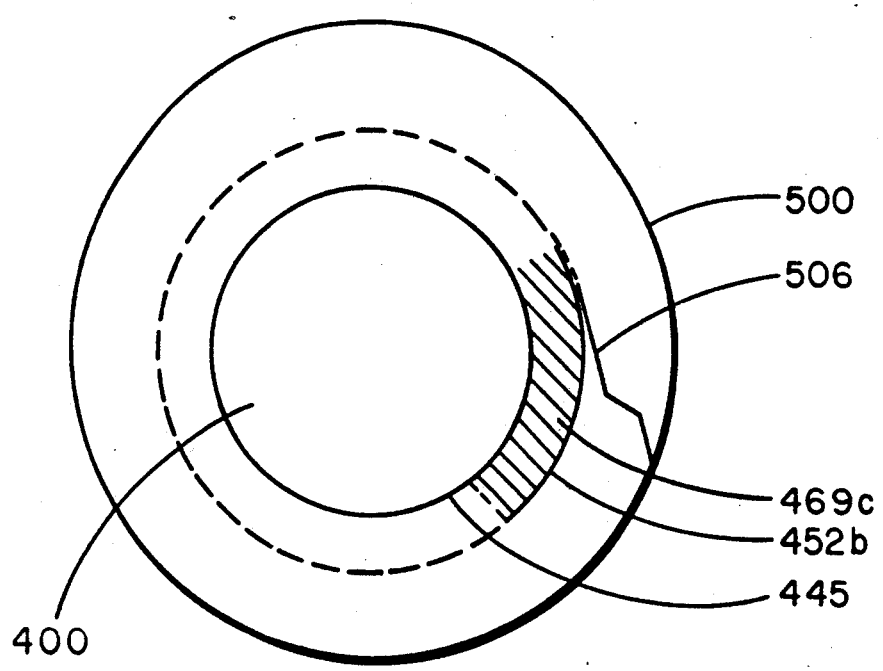

A battery holder 500 for holding a battery 400 with a second positive terminal located on the side of the battery is seen in FIGS. 5a and 5b. Battery holder 500 has the standard springs 502 and 504 for positive terminal 452a and negative terminal 454 respectively. In addition, battery holder 500 has an additional spring contact 506 for contacting the second positive terminal 452b which is separated from the container 445 of battery 400 by insulator 469c. With battery 400 being arranged to have its third terminal zn an arc along the surface of the side of the battery, the switching of the reserve portion of battery 400 into or out of play is simply accomplished by rotating the battery in the battery holder 500 to cause the third terminal 452b to contact or to break contact with spring contact 506. With three spring contacts 502, 504, and 506, battery holder 500 provides three "electrodes" or contact points for use.

Figure 6B:
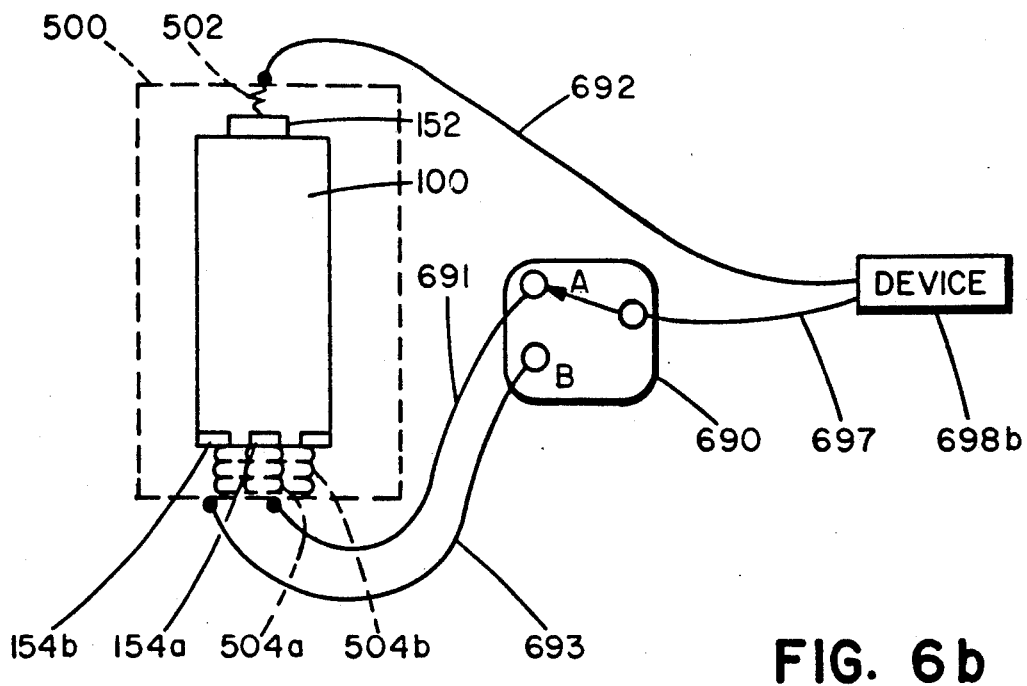
FIG. 6b is a schematic oz a system utilizing the batteries of the invention and showing activation via use of a standard switch.
Figure 6A:
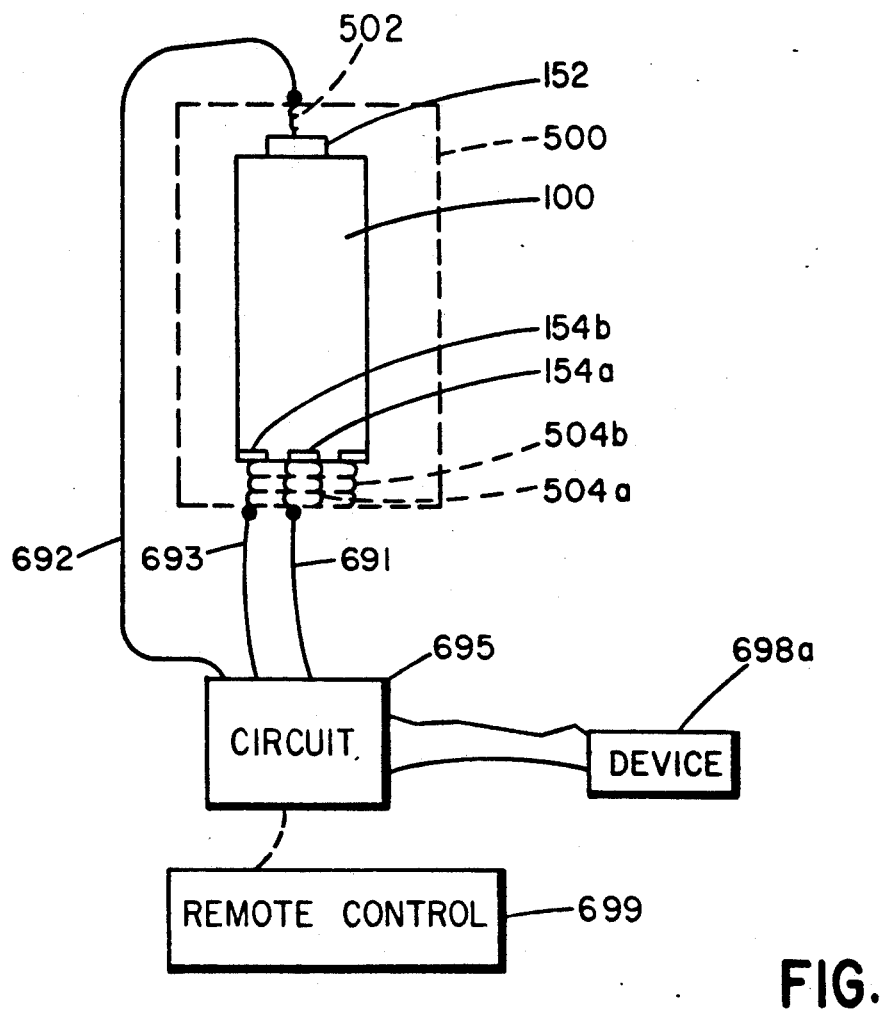
FIG. 6a is a schematic of a system utilizing the batteries of the invention and showing automatic or remote activation.

As seen in FIGS. 6a and 6b, different switching arrangements utilizing three electrodes or contact points are provided. In particular, FIG. 6a shows three leads 691, 692, and 693 from a battery case or holder 500 being fed to a "black box" 695, which in turn is coupled to the device 698a to be powered by the battery. While only one battery holder 500 is shown coupled to the black box 695, it will be appreciated that numerous battery holders may be coupled thereto. The black box 695 may include any of various circuits; from the very simple to the complex. For example, black box 695 may be a power quality sensing circuit which senses how well device 698a is operating. When device 698a ceases to operate as desired (e.g. tape speed decreases to 98% to desired rate), black box 695 might sense the same, and might automatically close a switch which would cause the reserve portion of the battery to be switched into the circuit so as to power the device 698a by itself or in parallel with the primary portion of the battery. Black box 695 might simultaneously cause a warning signal such as a red light, an audible alarm, or a message to appear on the device 698a, on the black box 695 (which might be located on or around the battery holder 500) or on other equipment which might be monitored remote from the device 698a.

If desired, black box 695 could be arranged such that the switching of the reserve portion of the battery is not accomplished automatically, but is activated by black box 695 in response to remote control means 699. Remote control means 699 can instruct black box 695 via any of numerous manners such as radio signals, signals sent over a wire, etc.

It will be appreciated that black box 695 can be viewed as representing any sensors or detection devices which detect incipient failure of the device the battery is operating. Upon such sensing or detection, the box automatically switches in the reserve portion of the battery of the invention. In switching, an option exists. Either the reserve can be switched in parallel with the main part of the battery, or the main battery can be disconnected and the reserve switched in alone.

Turning to FIG. 6b, a simpler switching arrangement is seen. In FIG. 6b, device 698b has one terminal coupled via wire 692 to the positive terminal of battery case 500, and a second terminal coupled to a mechanical three poll switch 690 via wire 697. Switch 690, in turn, is coupled via wires 691 and 693 to the main negative terminal and the backup negative terminal of battery case 500. While the primary cell of the battery contained in battery case 500 is properly powering the device 698b, switch 690 is preferably kept in position A as indicated in FIG. 6b. Upon an indication that the primary cell is no longer capable of properly powering device 698b, switch 690 can be thrown into position B which switches out the primary cell and causes device 698b to be powered by the reserve portion of the battery only.

Those skilled in the art should appreciate that the "black box" of FIG. 6a and the switch of FIG. 6b can be integrated into the battery holder 500 itself or the equipment utilizing the holder at the manufacturer's convenience. For example, the black box 695 could be implemented in a silicon chip, and be mounted along with an option dial or buttons (not shown) with or without visual, audible, or tactile alarm on the holder 500 or the equipment to permit a user to choose among various options of operation: e.g., automatic switching in of the reserve with or without alarm; manual activation of the reserve; remote activation of the reserve; etc.

Figure 7:
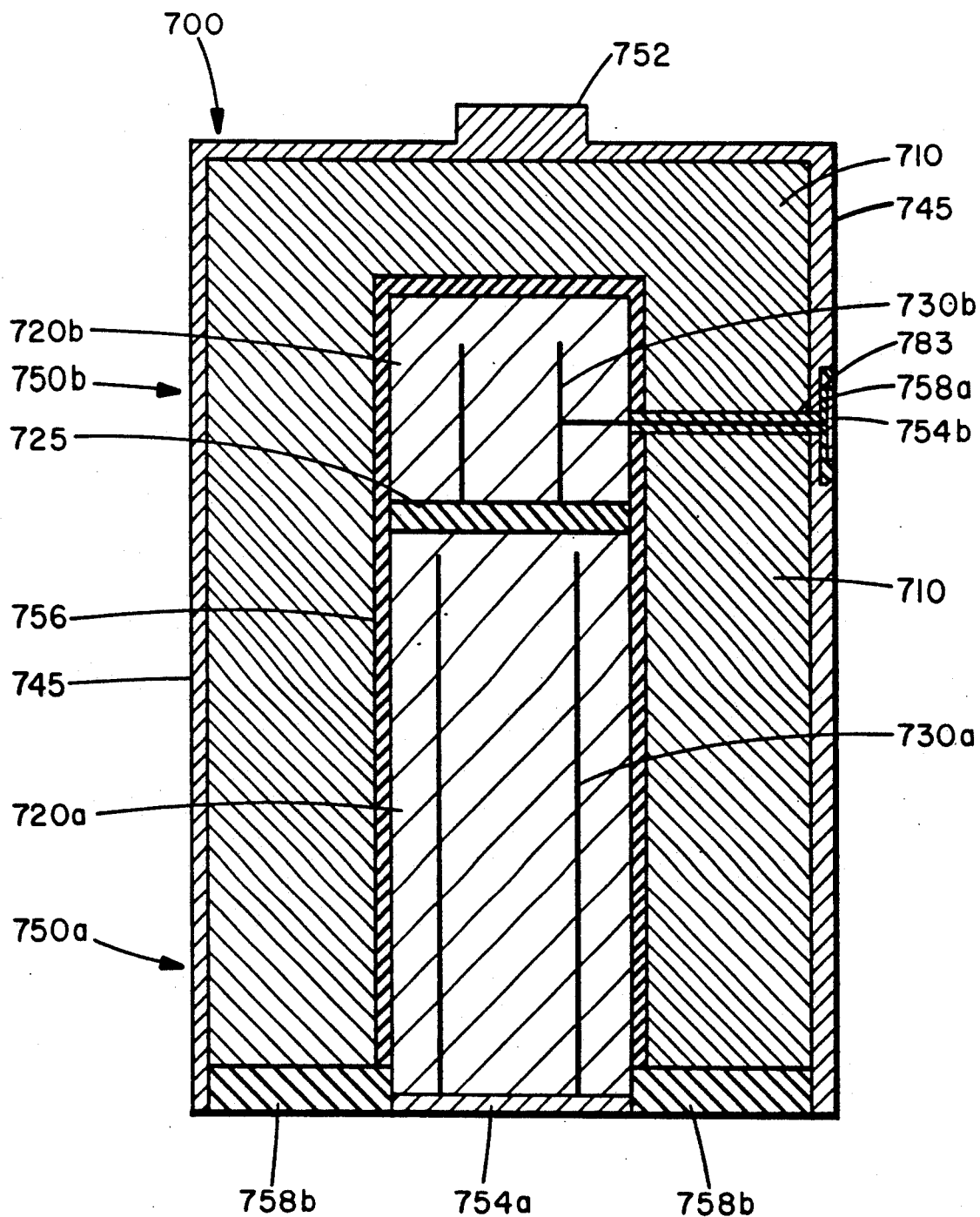
FIG. 7 is a cross-sectional view through a third embodiment of a sealed reserve type battery having three terminals, where two of the terminals are anode terminals with one of the anode terminals being on the side of the battery, and the third terminal is a cathode terminal.

Turning to FIG. 7, a third embodiment of the three electrode battery invention is seen with battery 700 having two anode electrodes and one cathode electrode. In FIG. 7, parts which are identical or similar to parts of FIG.. 1a are provided with similar numbers, except six hundred apart. Thus, battery 700 has a cathode 710, a larger and a smaller anode 720a and 720b which are separated by an insulator 725, a first anode current collector 730a, a second anode current collector 730b, and a seal 745. The cathode 710, larger anode 720a, and first anode current collector 730a provide a larger cell 750a, while the cathode 710, smaller anode 720b, and second anode current collector 730b provide a smaller reserve cell 750b. Cathode 710 is coupled to a positive terminal 752 and insulated from the second negative terminal 754b by insulator 758a. In the embodiment of battery 700, the first current collector 730a is directly connected to the first negative terminal 754a, while the second current collector 730b of the reserve cell 750b is directly coupled to the second negative terminal 754b. In order to connect the second current collector 730b to the second negative terminal 754b, the second current collector 730b is preferably insulated by insulator 783 as it extends through the membrane 756 (which separates the anodic material from the cathodic material) and through the cathodic material 710. Also, to prevent discharge of the reserve portion 750b of battery 700, the second negative terminal 754b is insulated from the first negative terminal 454a by insulator 758b. The second negative terminal 754b may ring the battery 700, or may be located on a portion of the side of the battery 700 as desired.

Figure 8A:
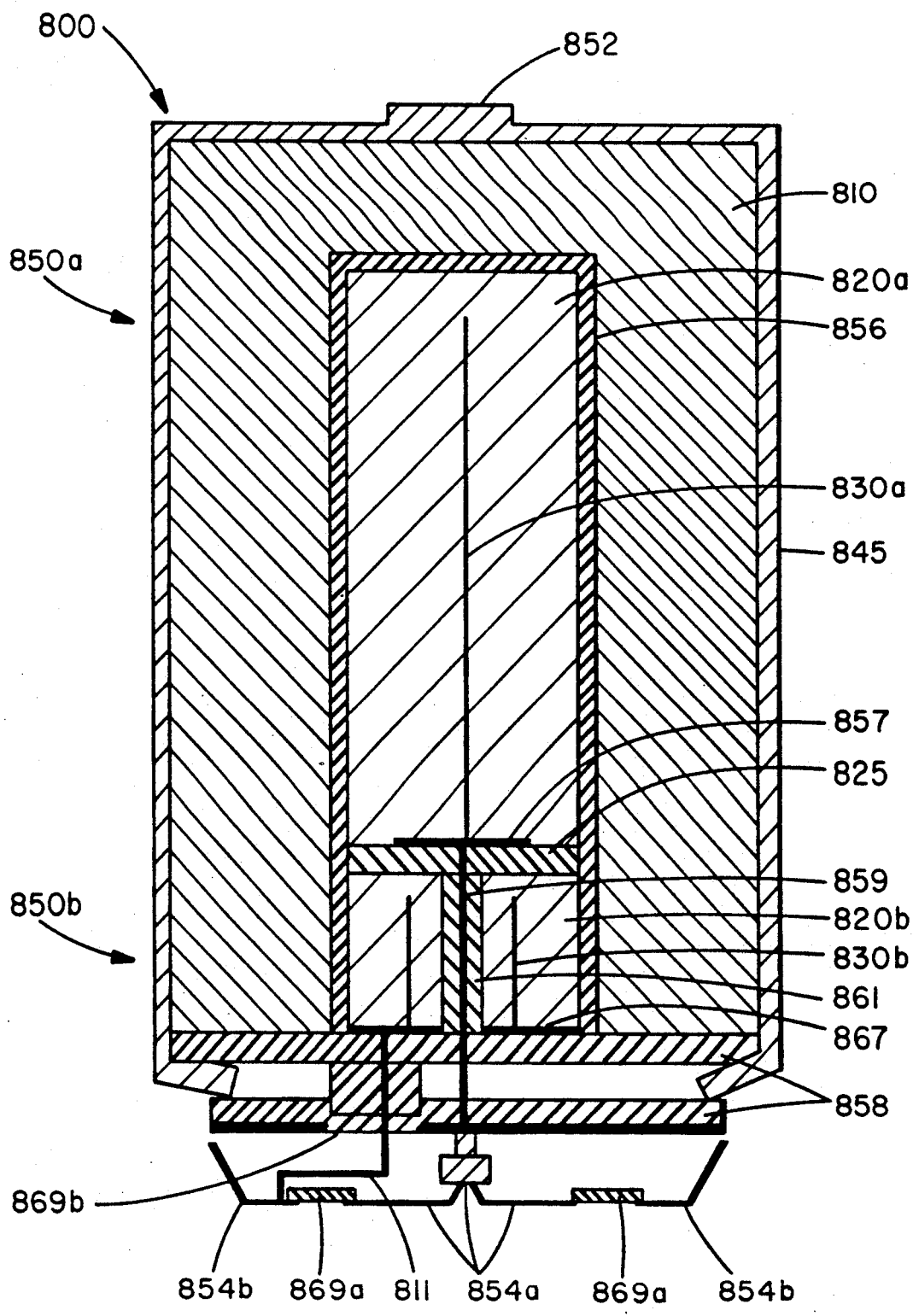
FIG. 8a is a cross-sectional view through a fourth embodiment of a sealed reserve type battery having three terminals, where two of the terminals are concentric anode terminals, and the third terminal is a cathode terminal.

A fourth embodiment of the battery invention is seen in FIG. 8a, where battery 800 is comprised of a cathode 810, a larger and a smaller anode 820a and 820b which are separated by an insulator 825, a single wire first anode current collector 830a, a second anode current collector 830b, and a seal 845. The cathode 810, larger anode 820a, and first anode current collector 830a provide a larger cell 850a, while the cathode 810, smaller anode 820b, and second anode current collector 830b provide a smaller reserve cell 850b. Cathode 810 is coupled directly to a positive terminal 852. On the other hand, the coupling of the anodes 820a and 820b to the negative terminals 854a and 854b is not as straightforward. As seen in FIG. 8a, the current collector 830a of the primary cell 850a terminates in a conducting plate 857 which is connected to an electronically conducting post or wire 859. The post 859 extends through the insulator 825 which separates anode 820a from anode 820b, through insulator 861 which insulates post 859 from the reserve anodic material 820b, and through insulators 858 which insulate the cathodic material 810 and the can or jacket 845 from the anodic material 820b, and connects directly to the first negative terminal 854a. First negative terminal 854a is preferably comprised of an thin indented metal plate which is soldered to a thicker nail head. Also, as seen in FIG. 8a, the current collector 830b of the secondary or reserve cell 850b terminates in a conducting plate 867 which has a feedthrough at 811 through insulator 869b to the negative terminal 854b. Negative terminals 854a and 854b are preferably insulated from each other by an insulating pad 869a which is also chosen to prevent leakage currents therethrough. If desired, insulators 861, 869b, 858, and even 869b may be integral with one or more of each other.

Figure 8B:
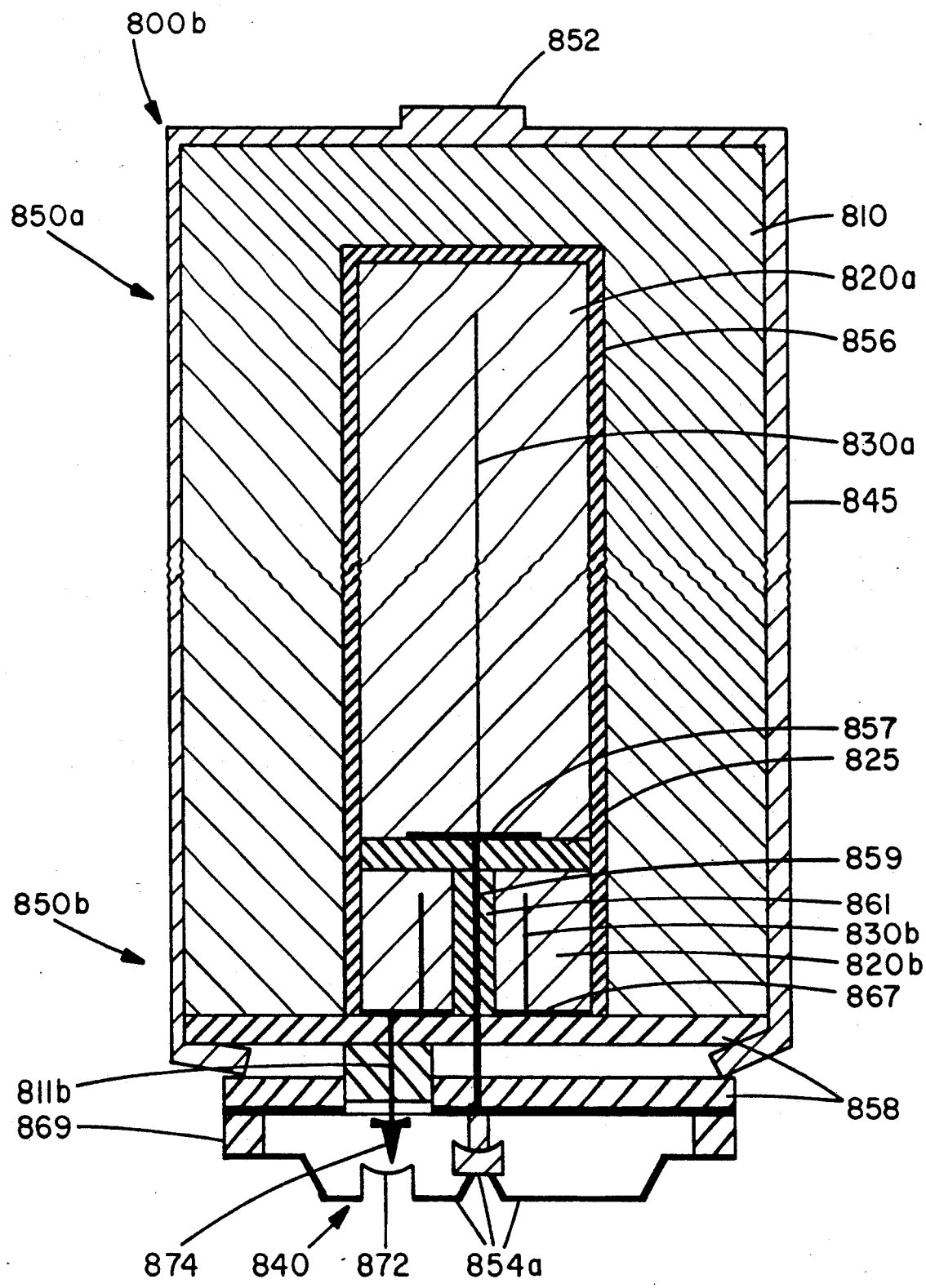
FIG. 8b is a cross-sectional view of the sealed reserve type battery of FIG. 8a modified to include an internal integral switch for activating the reserve anode.

Battery 800 of FIG. 8a may be modified slightly as shown in FIG. 8b to create a battery 800b having an internal integral switch 840 instead of a third terminal. Batteries with internal integral switches are described in greater detail in the parent application hereto, Ser. No. 07/649,907. As shown in FIG. 8b, instead of a third terminal, the feedthrough electrode 811b, which is coupled to the current collector 830b of the reserve cell 850b terminates in a contact means 874, and the second terminal 854a includes a bistable spring section 872. The spring section 872 and the contact 874 effectively comprise the switch 840. With a switch, when it is desired to activate the reserve cell 850b, bistable spring section 872 is indented to make contact with contact means 874, thereby bringing the reserve cell 850b into parallel with the primary cell 850a.

Figure 9:
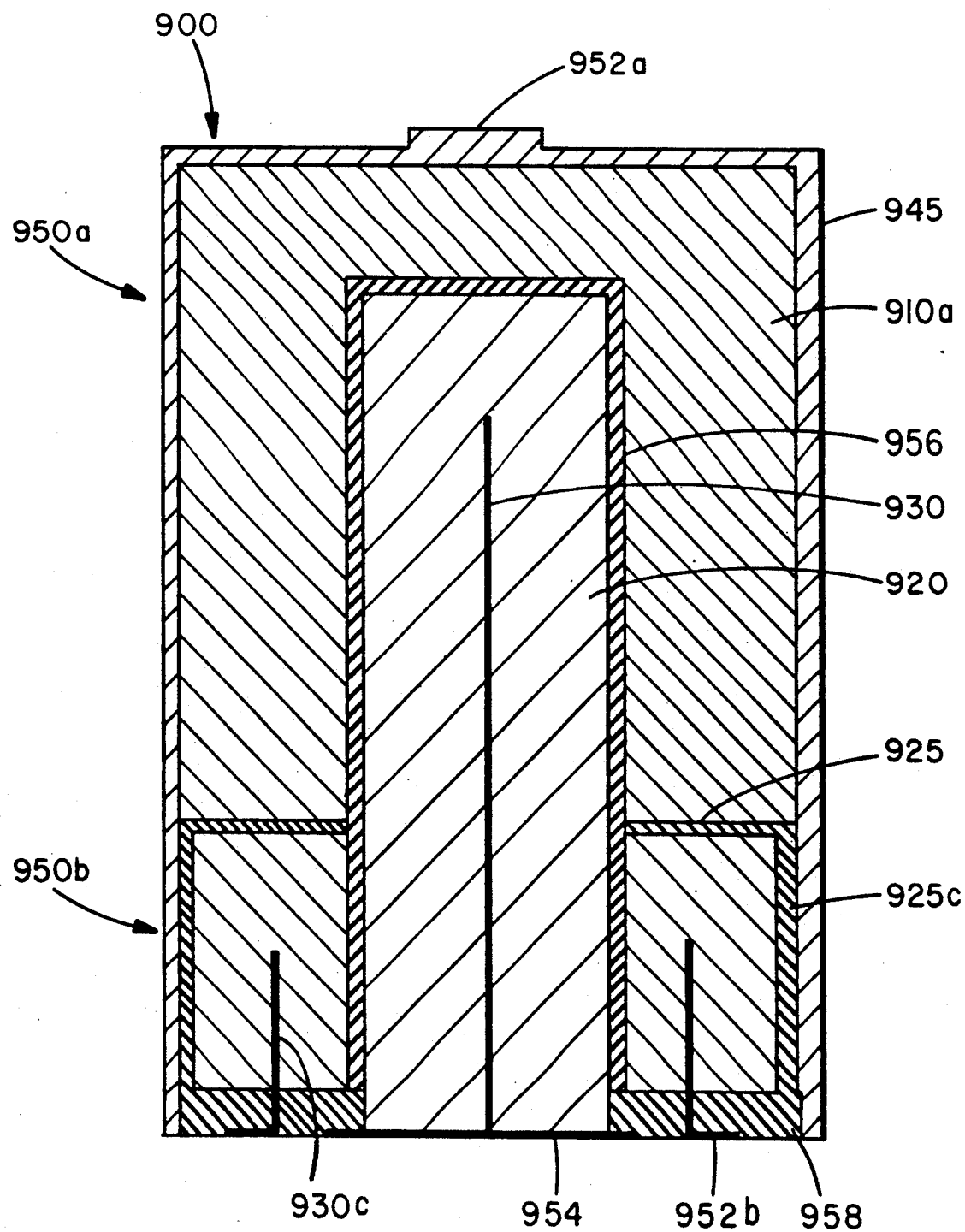
FIG. 9 is a cross-sectional view through a fifth embodiment of a sealed reserve type battery having three terminals, where two of the terminals are cathode terminals, the third terminal is an anode terminal, and one of the cathode terminals and the anode terminals are concentric.

A fifth embodiment of the battery invention is seen in FIG. 9, which in most respects is identical to the embodiment shown in FIG. 4a. The primary difference between the two embodiments is that the cathode electrodes 930c, instead of being brought out to the side of the battery, is brought out at the bottom of the battery, thereby simplifying the insulating arrangement. Thus, battery 900 of FIG. 9, has concentric terminals, with the inner terminal 954 being the negative terminal, and the outer terminal 952b being the second (reserve) positive terminal.

Figure 10A:
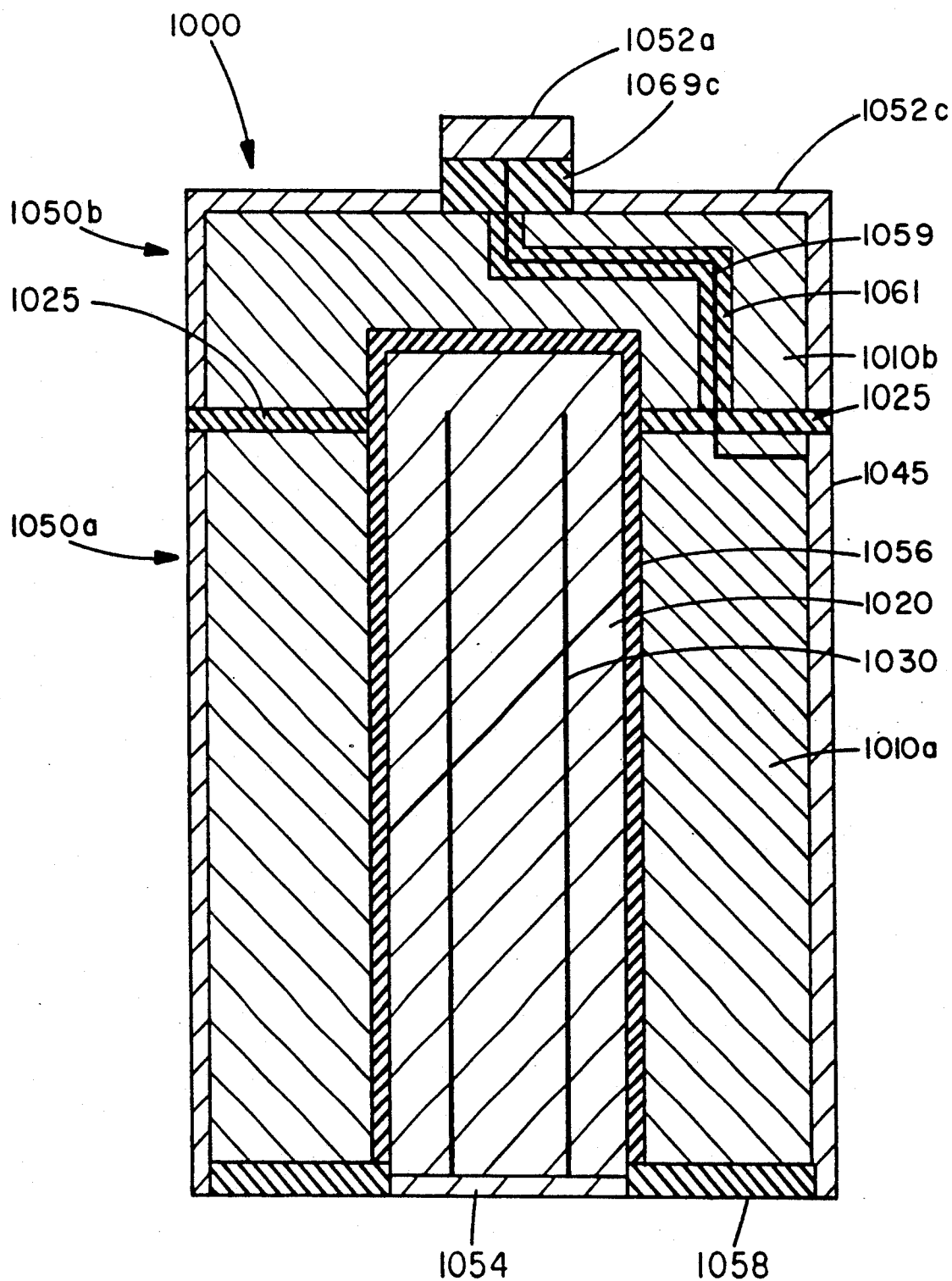
FIG. 10 is a cross-sectional view through a sixth embodiment of a sealed reserve type battery having three terminals, where two of the terminals are cathode terminals, and the third terminal is an anode terminal.

Battery 1000 of FIG. 10 represents a sixth embodiment of the battery invention. Battery 1000 has first and second cathodes 1010a and 1010b which are separated by an insulator 1025, an anode 1020, an anode current collector 1030, a membrane 1056 which separates the cathodic material from the anodic material, and a sealed can 1045. The first or larger cathode 1010a, the anode 1020, and the anode current collector 1030 provide a larger cell 1050a, while the second or smaller cathode 1010b, and anode 1020, provide a smaller reserve cell 1050b. In the embodiment of battery 1000, the larger cathode 1010a is coupled to a first positive terminal 1052a by wire 1059. Wire 1059 has one end coupled to the conductive can 1045 which surrounds the larger cathode 1010a. The wire 1059 then extends through insulator 1025, and runs through insulators 1061 and 1069c before coupling to first positive terminal 1052a. The second positive terminal 1052c is effectively the upper portion of the can 1045 which surrounds the reserve portion 1010b of the cathode. The anode 1020 is directly coupled to the negative terminal 1054 by current collecting electrode 1030. In battery 1000, the first positive terminal 1052a is insulated from the second positive terminal 1052c by insulator 1069c and by insulator 1025 which interrupts the can 1045 by extending therethrough (the bottom portion of can 1045 effectively also serving as a first positive terminal. Insulator 1058 is also provided to prevent direct connection between the negative terminal 1054 and the first positive terminal 1052a.

Figure 11:
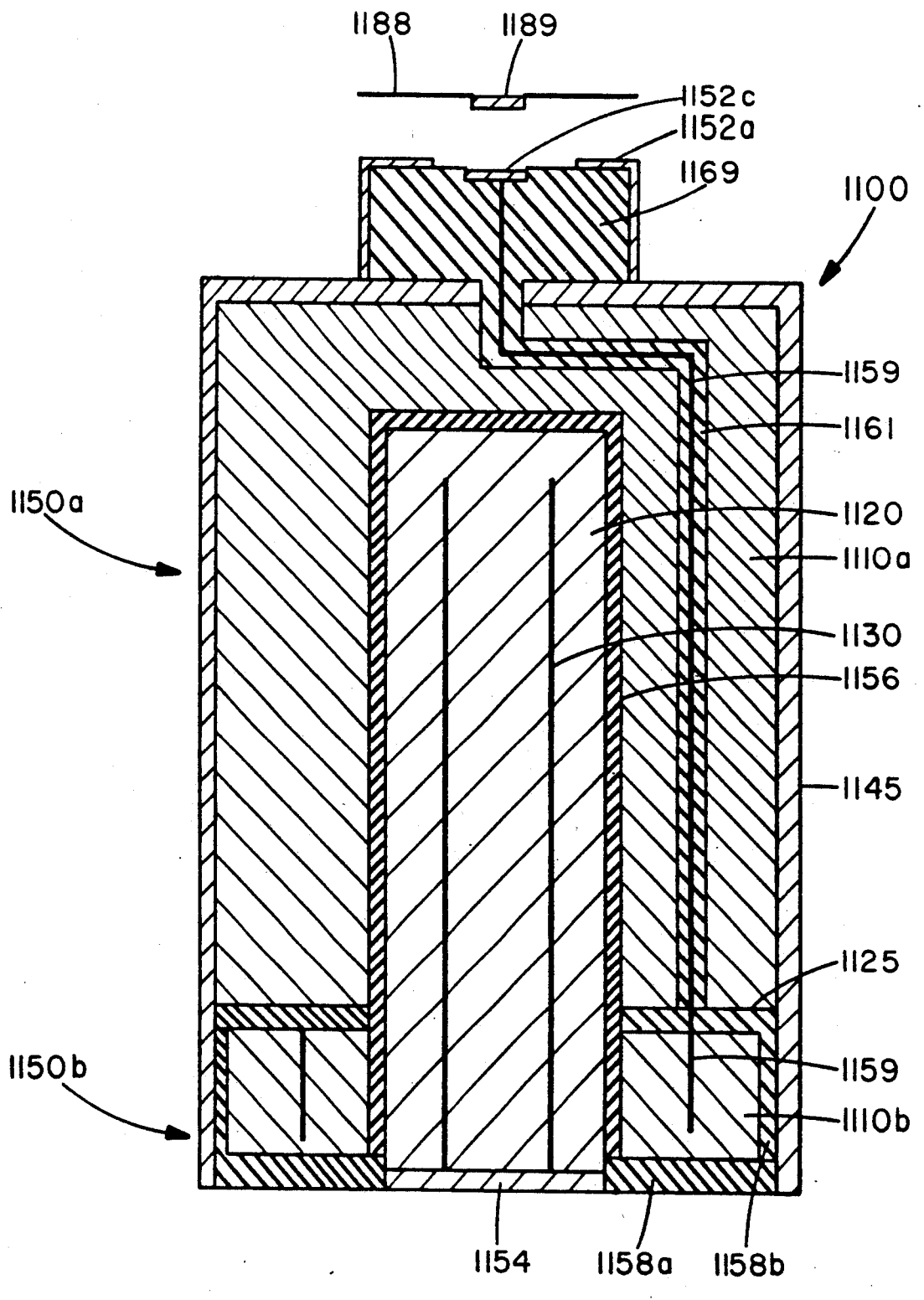
FIG. 11 is a cross-sectional view of through a seventh embodiment of a sealed reserve type battery having three terminals, where two of the terminals are cathode terminals, and the third terminal is an anode terminal.

A seventh embodiment of the invention is seen in FIG. 11 where battery 1100 has first and second cathodes 1110a and 1110b which are separated by an insulator 1125, an anode 1120, an anode current collector 1130, a membrane 1156 which separates the cathodic material from the anodic material, and a sealed can 1145. The first or larger cathode 1110a, the anode 1120, and the anode current collector 1130 provide a larger cell 1150a, while the second or smaller cathode 1110b, and anode 1120, provide a smaller reserve cell 1150b. In the embodiment of battery 1100, the reserve cathode 1110b is coupled to a second positive terminal 1052c by wire 1159. Wire 1159, which also acts as a cathode current collector, has one end located in the reserve cathode portion 1110b. The wire 1059 then extends through insulator 1125, and runs through insulators 1161 and 1169c before coupling to second positive terminal 1152c. The first positive terminal 1052a also effectively includes can 1045 which surrounds the cathode material. The anode 1120 is directly coupled to the negative terminal 1154 by current collecting electrode 1130. In battery 1100, the first positive terminal 1152a is insulated from the second positive terminal 1152c by insulator 1169 and by insulators 1125 and 1158b. Insulator 1158a insulates the negative terminal 1154 from the cathodes.

As seen in FIG. 11, a cap or end plate 1188 having contact pad 1189 is provided for the battery 1100. The cap can be attached to the top of the battery with electrically conducting glue or other desired means. With the cap in place, the primary and reserve portions of the battery are electrically connected, with positive terminals 1152a and 1152c touching. With this arrangement, the battery 1100 appears to be a standard battery and can be used with standard equipment. However, if a battery holder having two cathode contacts is provided, the end cap 1188 can be removed from the battery, so that a three terminal battery is provided. The three terminal battery of FIG. 11 has the reserve cathode 1152c in the middle and the primary cathode 1152a surrounding and concentric therewith.

There have been described and illustrated herein sealed reserve type batteries. While particular embodiments have been described, it is not intended that the invention be limited thereby, as it is intended that the invention be as broad in scope as the art will allow. Thus, while the invention has been described with reference to AAA, AA, C, or D primary type batteries, it will be appreciated that the invention applies to button-type batteries and to secondary type (i.e. rechargeable) batteries as well. Further, while most of the disclosed embodiments were alkaline or mercury type batteries, it will be appreciated that the invention also applies to other types of batteries, including by way of example and not limitation, Leclanche, lead-acid, and lithium cells. Also, while the embodiments of the invention were disclosed as using insulators between the primary anode and the reserve anode, it will be appreciated that insulation (i.e. complete isolation) is desirable but not necessary, and that small leakage currents can be tolerated. In fact, with proper design, even relatively large leakage current can be tolerated, provided that there is some isolation between the main and the reserve material such that the output voltage of the larger cell drops off significantly before undesirable amounts of the reserve materials are used up. Thus, with proper design, the insulation details need not be exact, and resultingly, manufacturing costs can be reduced.

Further yet, those skilled in the art will recognize that the principles set forth by the battery invention disclosed herein may be extended in numerous ways. For example, a battery having multiple reserve cells is easily accomplished, and battery holders having multiple terminals for the multiple reserve cell battery will similarly suggest itself. Moreover, as previously mentioned, using the teachings of the invention, reverse polarity batteries are easily obtained with minor design modifications. Additional design modifications, where aspects of one of the shown embodiments are combined with other aspects of another shown embodiment will also suggest themselves to those skilled in the art. For example, while not preferred, a reserve anode embodiment can be combined with a reserve cathode embodiment to arrive at a four terminal embodiment with two positive terminals and two negative terminals simply by extending the separating membrane across both the anode and cathode; i.e. across the entire battery. Therefore, it will be apparent to those skilled in the art that yet additional changes and modifications may be made to the invention as described without departing from the scope and spirit of the invention as set forth in the claims.

We claim:
1. A sealed battery, comprising:
   a) cathodic and anodic materials in proximity with each other, with at least one of said cathodic and anodic materials being divided into primary and reserve portions;
   b) isolation means adjacently contacting said primary and reserve portions for isolating said primary and reserve portions;
   c) a membrane through which ions can flow, said membrane separating said cathodic and anodic materials; and
   d) first, second, and third terminals, wherein one of said cathodic and anodic materials is coupled to said first terminal, the primary portion of the other of said cathodic and anodic materials is coupled to said second terminal, and the secondary portion of the other of said cathodic and anodic materials is coupled to said third terminal, and wherein said first and second terminals are located on opposed ends of said sealed battery.

2. A sealed battery according to claim 1, further comprising:
   e) an electrolyte located in said cathodic and anodic materials.

3. A sealed battery according to claim 1, further comprising:
first and second current collecting means, wherein
   said anodic material is divided into primary and reserve portions with said first current collecting means located in said primary portion of said anodic material and coupling said primary portion of said anodic material with said second terminal, and said second current collecting means is located in said reserve portion of said said anodic material and couples said reserve portion of said anodic material with said third terminal,
   said primary portion of said anodic material, said cathodic material, and said first current collecting means comprise a primary cell, and
   said reserve portion of said anodic material, said cathodic material, and said second current collecting means comprise a reserve cell.

4. A sealed battery according to claim 3, wherein:
said primary portion is substantially larger than said reserve portion.

5. A sealed battery according to claim 4,, further comprising:
second isolation means for isolating said second terminal from said third terminal.

6. A sealed battery according to claim 5, further comprising:
third isolation means for isolating said first terminal from said second and third terminals.

7. A sealed battery according to claim 3, further comprising:
first current collector insulating means, wherein said first current collector includes a portion which extends through said isolation means and through said reserve portion of said anode, and said first current collector insulating means surrounds said first current collecting means as it extends through said reserve portion of said anode.

8. A sealed battery according to claim 7, wherein:
said second and third terminals are located on the same end of said sealed battery.

9. A sealed battery according to claim 8/, wherein:
said third terminal is concentrically arranged around said second terminal.

10. A sealed battery according to claim 8, wherein:
said third terminal is eccentrically located relative to said second terminal.

11. A sealed battery according to claim 3, further comprising:
first current collector insulating means, wherein said first current collector includes a portion which extends through said membrane and through said cathodic material, and said first current collector insulating means surrounds said first current collecting means as it extends through said cathodic material.

12. A sealed battery according to claim 11, wherein:

said third terminal is located on a side wall of said sealed battery.

13. A sealed battery according to claim 1, further comprising:
first and second current collecting means, wherein
said cathodic material is divided into primary and reserve portions,
said first current collecting means is located in said anodic material and is coupled to said first terminal,
said second current collecting means is located in at least said reserve portion of said cathodic material is coupled to said third terminal,
said primary portion of said cathodic material, said anodic material, and said first current collecting means comprise a primary cell, and
said reserve portion of said cathodic material, said anodic material, and said first current collecting means comprise a reserve cell.

14. A sealed battery according to claim 1-z, wherein:
said primary portion is substantially larger than said reserve portion.

15. A sealed battery according to claim 14, further comprising:
second isolation means for isolating at least one of said second and third terminals from said first terminal.

16. A sealed battery according to claim 15, further comprising:
third isolation means for isolating said second terminal from said third terminal.

17. A sealed battery according to claim 13, further comprising:
current collector insulating means, wherein said second current collector includes a portion which extends through said isolation means and through said reserve portion of said cathode, and said current collector insulating means surrounds said second current collecting means as it extends through said reserve portion of said cathode.

18. A sealed battery according to claim 17, wherein:
said second and third terminals are located on the same end of said sealed battery.

19. A sealed battery according to claim 18, wherein:
said second and third terminals are concentrically arranged.

20. A sealed battery according to claim 19, further comprising:
conductive cap means for contacting, covering, and electrically coupling said second and third terminals.

21. A sealed battery according to claim 13, wherein:
said third terminal is located on the same end of said sealed battery as said first terminal.

22. A sealed battery according to claim 13, wherein:
said third terminal is located on a side wall of said sealed battery.

23. A battery holder for a first battery having three terminals, where a first and a second of said three terminals are located on opposing ends of said first battery, said battery holder comprising:
a) a nonconductive housing having at least first and second opposite end walls and at least one side wall coupling said first and second end walls; and
b) first, second, and third electrical contacts, wherein said first contact is coupled to and extends inward from a first of said opposite end walls of said housing, said second contact is coupled to and extends inward from a second of said opposite end walls of said housing, and wherein said first electrical contact contacts said first terminal of said first battery, said second of said electrical contacts is located on an opposite end of said housing from said first electrical contact and contacts said second terminal of said first battery, and said third electrical contact contacts said third terminal of said first battery, and wherein said nonconductive housing and said first and second contacts are arranged such that said first battery having three terminals fits in a friction fit relationship into said housing and between said first and second electrical contacts.

24. A battery holder according to claim 23, wherein:
said third electrical contact is located along said side wall of said nonconductive housing.

25. A battery holder according to claim 24, wherein:
said side wall of said nonconductive housing is round in cross-section, and said third electrical contact extends only partially circumferentially along said side wall.

26. A battery holder according to claim 23, wherein:
said third electrical contact is located on the same wall as said first electrical contact.

27. A battery holder according to claim 26, wherein:
said first and third electrical contacts are concentrically arranged.

28. A battery holder according to claim 23, wherein:
at least one of said first and second electrical contacts are spring contacts.

29. A battery holder according to claim 28, wherein:
said third electrical contact is a spring contact.

30. A battery holder according to claim 23, wherein:
said battery holder holds only said first battery.

31. A battery holder according to claim 23, wherein:
said battery holder holds a plurality of batteries having three terminals, and
said battery holder has three times the number of electrical contacts as the number of batteries it holds.

32. A battery holder according to claim 23, wherein:
said battery holder has at least $2n+1$ battery contacts where n is the number of batteries said battery holder holds.

* * * * *